Sept. 15, 1964 A. WEYGANG 3,149,239
TRANSISTOR SWITCH UTILIZING A CONTROL TRANSISTOR AND ZENER DIODE
Filed Jan. 25, 1961
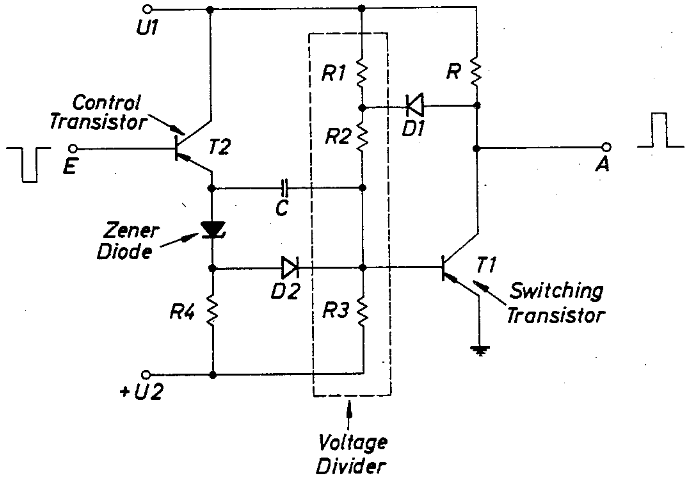
INVENTOR
A. Weygang
BY [signature]
ATTORNEY United States Patent Office 3,149,239

Patented Sept. 15, 1964

3,149,239
TRANSISTOR SWITCH UTILIZING A CONTROL TRANSISTOR AND ZENER DIODE

Adolf Weygang, Stuttgart-Zuffenhausen, Germany, assignor to International Standard Electric Corporation, New York, N.Y., a corporation of Delaware Filed Jan. 25, 1961, Ser. No. 84,925
Claims priority, application Germany Feb. 9, 1960
2 Claims. (Cl. 307—88.5)

This invention relates to a transistor switch which, without requiring any additional investment in circuitry, avoids an overbiasing and the resulting accumulation of minority carriers in the base electrode, and in which only a small amplitude of control pulses is required.

As a rule, conventional transistor switches are designed in such a way that the collector current in the normal condition, i.e. when no control pulses are applied, either equals zero, or is equal to the collector current $I_{co}$ flowing in the event of an open base. Upon the application of a control pulse, in the switched-on or operating condition, a collector current flows whose magnitude approximately equals the saturation current, determined by the operating resistance arranged in the collector circuit. The assignment of the collector current to these two possible circuit conditions, however, presents a number of disadvantages, one of which is the storage or accumulation of minority carriers in the base when the latter is overbiased. It is well known that the storing of minority carriers causes a continuation in the flow of the collector current subsequent to the disconnection of the control voltage, and consequently an unwanted time delay which reduces the maximum switching frequency of the transistor switch.

Various methods are known for avoiding this storage effect. One of the measures usually employed consists of limiting the base current with the aid of a high-ohmic resistor arranged in the base circuit. The disadvantage resulting therefrom resides in the necessary of a high control voltage. The majority of this voltage drops off at the resistor arranged in the base circuit, while only a slight portion of it is utilized for actually controlling the switching transistor. Other measures for avoiding an overbiasing of the base by the minority carriers include the limitation of the minimum collector-emitter voltage of the switching transistor by the action of a diode connected to the collector and applied to a fixed potential, and the insertion of a non-linear negative feedback between the collector and the base of the switching transistor. Not to mention the necessary increased investment in circuitry, both methods have their particular disadvantages. With respect to the first-mentioned method, the disadvantage substantially resides in the fact that the collector current is not limited so that an overloading of the switching transistor may result. The disadvantage in the other method is that the control voltage, in the case of a proper insertion of the non-linear negative feedback, is compulsorily and substantially higher than the effective control voltage necessary between the base and the emitter.

The object of the invention is a transistor switch which, on the one hand, avoids an oversaturation of the base with minority carriers in the case of an overbiasing, and which, on the other hand, requires only small control voltages.

According to the invention, the transistor switch is so designed that a collector current of a defined value is assigned to the normal condition, and a collector current of a lower value than that assigned to the normal condition is assigned to the operating condition.

Advantageously a collector current whose value is approximately equal to the saturation current, determined by an operating resistor arranged in the collector circuit, may be assigned to the normal condition. Furthermore, it is advantageous to assign the collector current zero to the operating condition, so that the emitter diode is blocked in the case of an overbiasing in the operating condition. Appropriately, the base electrode of the switching transistor may be applied to a defined potential for adjusting the collector current flowing in the normal condition. A voltage divider may be provided for producing this base potential.

Steps may be taken for limiting the minimum collector-emitter voltage. One such step consists of a diode connected between the collector electrode of the switching transistor and an additional tapping of the voltage divider for producing the base potential. The potential position of the tapping and the polarity of the diode are chosen so that the diode, when falling short of a certain minimum potential difference between the collector and the base electrode of the switching transistor becomes unblocked, thus retaining the collector potential. It is possible, in the case of a transistor switch according to the invention in which the control potentials are applied to the base electrode, for a second diode to be placed in the control lead. This diode is polarized in such a way that a connecting-through of the control lead is effected as soon as the potential exceeds the defined base potential in the direction of the emitter potential.

An additional control circuit may also be provided which is composed of a control transistor arranged in a collector or emitter-sequence-circuit. In this case, either a resistor may be arranged in the emitter lead of the control transistor, and the control lead (the free end of the second diode) may be connected to the emitter of the control transistor, or, for the purpose of effecting the potential displacement of the control potential, the series connection of a resistor and a Zener diode may be arranged in the emitter lead of the control transistor, and the control lead may be connected to the junction point between the resistor and the Zener diode. This arrangement has the advantage that the transistor switch becomes extremely insensitive to noise pulses. For increasing the steepness of the edges of the switching pulses it is advantageous in this arrangement to insert a bridging capacitor between the emitter of the control transistor and the base of the switching transistor.

The advantage of this type of transistor switch over the conventional types of switches is clearly evident. Since, in the conventional types of transistor switches, an overbiasing causes an accumulation of minority carriers in the base, and since special measures have to be taken for avoiding this accumulation (and these measures entail further disadvantages), the subject transistor switch has the advantage that an overbiasing merely causes an increased biasing of the emitter diode of the switching transistor in the backward direction (blocking direction). In addition thereto, in this type of transistor switch, the insertion of a high resistance into the base lead has now become superfluous, so that the necessary control voltage is substantially lower.

The above-mentioned and other features and objects of the invention and the matter of attaining them will become more apparent, and the invention itself will be best understood by reference to the following description of an embodiment of the invention taken in conjunction with the accompanying drawing.

Turning now to the drawing, it may be seen that the switching transistor T1 is controlled by the control transistor T2. In the normal condition, a collector current traverses the switching transistor T1, whose value is determined by the defined base potential which is supplied by the voltage divider composed of the resistors R1, R2 and R3. The value of this collector current is approximately $U_1/R$, hence approximately equal to the saturation current determined by the operating resistance R, arranged in the collector circuit. For fixing a certain minimum potential difference between the collector and the base of the switching transistor T1, the diode D1 is provided. The tapping point of the voltage divider (applied to the connecting point between the resistor R1 and R2) to which the diode D1 is connected, is chosen so that the diode, upon falling short of the minimum potential difference between the collector and the base of the switching transistor T1, is switched to become conductive, thus retaining the collector potential. In the normal condition, the voltage on the output A, of the transistor switch, differs only slightly from zero, e.g. −1 volt. The collector current of the switching transistor T1 in the normal condition is independent of the control voltage applied to the input E. To achieve this independence, the diode D2 is arranged in the control lead of the switching transistor T1. This diode is polarized in such a way that a connecting-through of the control lead is only effected if the control potential exceeds the base potential, which is defined by the voltage divider, in the direction of the emitter potential. Accordingly, in the normal condition, a potential has to be applied to the connecting point of the diode D2 with the resistor R4 and the Zener diode, which is more negative than the base potential of the switching transistor T1. In accordance therewith, a voltage must be applied to the base of the control transistor T2 (in the normal condition of the switching transistor T1), which is more negative than the base potential of the switching transistor T1 (this voltage is, of course, displaced by the Zener potential of the Zener diode and the base-emitter voltage of the control transistor T2). Below this limiting value, however, this control voltage may vary at will. In the operating condition of the switching transistor T1, the collector current equals zero. Accordingly, the voltage applied to the output A approximately equals −U1. The minimum voltage which is necessary to enable the switching transistor T1 to go into the operating condition is the potential difference between the zero potential and the base potential of the switching transistor T1 in the normal condition. To reduce the necessary control output, the resistance value of the resistor R3, as well as of the resistors R1+R2 are chosen to be as high as possible. For this reason, the resistor R3 is not connected to ground, but is applied to the positive voltage U2. In the operating condition of T1, the diode D2 is connected in the forward direction. The base potential of the switching transistor T1, accordingly, is equal to the base potential of the control transistor T2, displaced by a potential difference which is established by the Zener potential of the Zener diode Z and the base-emitter voltage of the control transistor T2, and is thus also equal to the input voltage E displaced by the said potential difference. To achieve a collector current equal to zero in the switching transistor T1, the base potential of this transistor, in the operating condition, has to be either zero or positive.

Accordingly, the input voltage in the operating condition, which is displaced towards the negative by the Zener potential of the Zener diode Z and the base-emitter voltage of the control transistor T2, has to be more positive than the emitter potential T1. However, above this limiting value, the input voltage may be varied at will, because in this case the emitter diode of the switching transistor T1 is only biased more or less in the backward direction, and because the collector current of the switching transistor T1 still remains equal to zero.

When designating the potential difference between the emitter and the base of the switching transistor T1 in the normal condition by $U_{EB1}$, the potential difference between the emitter and the base of the control transistor T2 by $U_{EB2}$, and the Zener potential of the Zener diode Z by $U_Z$, then the conditional equations relating to the input voltage $U_E$ with respect to the two circuit conditions can be expressed by the following formulae:

With respect to the operating condition $$U_E \geq -(U_Z + U_{EB2})$$

With respect to the normal condition $$U_E \leq -(U_{EB1} + U_Z + U_{EB2})$$

Accordingly, the voltage deviation for switching the switching transistor T1 equals $U_{EB1}$. The threshold value of the input voltage $U_E$ can be displaced at will by correspondingly selecting the Zener potential $U_Z$.

For improving the steepness of the edges of the switching pulses it is advisable to connect the bridging capacitor C between the emitter of the control transistor T2 and the base of the switching transistor T1.

It will be understood that various changes in the details, materials and arrangements of parts which have herein been described and illustrated in order to explain one embodiment of the invention may be made by those skilled in the art within the principle and scope of the invention, as expressed in the appended claims.

What is claimed is:

1. A transistor switch comprising a switching transistor, means connected to the collector of said switching transistor for maintaining the collector potential within predetermined limits, means connected to the emitter of said switching transistor for maintaining the emitter potential constant outside said limits, means for maintaining the base potential between the emitter and collector potentials whereby said transistor is forward biased and conducting, means coupled to said last-mentioned means and responsive to an input signal for altering the base potential so that said transistor is no longer forward biased, an output connection to the collector whereby, when said transistor is forward biased as it is in its normal condition, the output is substantially the emitter potential, and when said transistor is cut off, the output is the collector potential, said means for maintaining the base potential comprising a voltage divider, the base lead being connected to a tapping point on said voltage divider, said means responsive to an input signal comprising a further diode connected on one end to the base of said switching transistor and polarized to be connected through to the base when the potential on it exceeds the base potential in the direction of the emitter potential, a control transistor, a Zener diode connected to the emitter of said control transistor, and a resistor in series with said Zener diode, the free end of said resistor being connected to said voltage divider, and the free end of said further diode being connected to the junction of said Zener diode with said last named resistor.

2. A transistor switch as set forth in claim 1, further comprising a capacitor connected between the emitter of said control transistor and the base of said switching transistor.

References Cited in the file of this patent

UNITED STATES PATENTS

| | | |
|---|---|---|
| 2,829,281 | Overbeek | Apr. 1, 1958 |
| 2,990,478 | Scarbrough | June 27, 1961 |
| 2,995,664 | Deuitch | Aug. 8, 1961 |